(12) United States Patent
Dietrich

(10) Patent No.: US 7,331,210 B2
(45) Date of Patent: Feb. 19, 2008

(54) CONVEYOR WEIGHBRIDGE WITH BUILT-IN CALIBRATION WEIGHT

(76) Inventor: Ronald Dietrich, 2154 Beckmann Rd., Lenzburg, IL (US) 62255

( * ) Notice: Subject to any disclaimer, the term of this patent is extended or adjusted under 35 U.S.C. 154(b) by 0 days.

(21) Appl. No.: 11/520,086

(22) Filed: Sep. 13, 2006

(65) Prior Publication Data

US 2007/0074560 A1 Apr. 5, 2007

Related U.S. Application Data

(60) Provisional application No. 60/722,318, filed on Sep. 30, 2005.

(51) Int. Cl.
*G01G 23/01* (2006.01)
*G01G 11/04* (2006.01)

(52) U.S. Cl. ...................... 73/1.13; 177/145
(58) Field of Classification Search ................ 73/1.13, 73/1.15; 177/16, 50, 119, 145
See application file for complete search history.

(56) References Cited

U.S. PATENT DOCUMENTS

| | | | | |
|---|---|---|---|---|
| 3,396,573 A | * | 8/1968 | Blubaugh | 73/1.13 |
| 3,656,337 A | * | 4/1972 | McDonald | 73/1.13 |
| 3,850,023 A | * | 11/1974 | McDonald | 73/1.13 |
| 3,976,150 A | * | 8/1976 | Wilson et al. | 177/16 |
| 4,611,676 A | * | 9/1986 | Meiring | 177/50 |
| 4,682,664 A | * | 7/1987 | Kemp | 177/16 |
| 4,932,486 A | * | 6/1990 | Komoto et al. | 177/50 |
| 4,932,487 A | * | 6/1990 | Melcher et al. | 177/50 |
| 5,550,328 A | * | 8/1996 | Freeman et al. | 177/50 |
| 5,686,653 A | * | 11/1997 | Homer et al. | 73/1.13 |
| 5,900,591 A | * | 5/1999 | Liubakka | 177/50 |
| 6,414,252 B1 | * | 7/2002 | Emery et al. | 177/229 |

* cited by examiner

*Primary Examiner*—Randy W Gibson
(74) *Attorney, Agent, or Firm*—Paul M. Denk

(57) ABSTRACT

The loadcell live idler platform scale has an idler to support a conveyor belt and a frame on which the rollers are mounted. The weighbridge has four load cells connected perpendicular to each end of the frame, strain gauges to receive deflections from each pair of load cells, a speed detector for the material passing upon the conveyor, and a controller for converting the signals of the strain gauges and the speed detector to the desired weight and volume data along with calibrating the scale. Beneath the idler, the scale has a calibration weight resting in a tray. Two cables, attached to the idler and its mounts, suspend the calibration weight and an activator raises and lowers the calibration weight. The calibration weight and activator are generally cylindrical and parallel to the longitudinal axis of the idler.

8 Claims, 5 Drawing Sheets

CONVEYOR WEIGHBRIDGE WITH BUILT-IN CALIBRATION WEIGHT

CROSS REFERENCE TO RELATED APPLICATION

This is a non-provisional application which claims priority to the provisional application Ser. No. 60/722,318 filed Sep. 30, 2005 and commonly owned by the same inventor. The above noted application is incorporated herein by reference. This patent application is related to U.S. Pat. No. 5,338,901 which issued on Aug. 16, 1994, for a Conveyor Belt Weigher Incorporating Two End Located Parallel Beam Load Cells and has the same inventor and assignee.

BACKGROUND OF THE INVENTION

The loadcell live idler platform scale relates generally to weighing devices for bulk product. More specifically, the present invention refers to conveyor belt scales of the weighbridge type, used for weighing material as it is transported along a conveyor belt. A unique aspect of the present invention is a calibration weight that temporarily loads an idler with a known weight for calibrating the load cells.

For decades, mines, quarries, foundries, mills, and the like have moved bulk product by conveyor from one location to another. A conveyor also moves product between one stage in a process to another. Each stage in a process likely calls for the weight of product entering the process. Conveyor belt scales are used for continuous weighing of bulk materials transported along the conveyor belt. Examples of such materials are coal, aggregate, slag, or wood chips among others. Knowing the weight allows for adjusting a process and results in an end product within tolerances.

In general, conveyor belt scales employ rollers or idlers that are inserted into the conveyor system, either in place of an existing idler assembly or in addition to the existing idlers. The conveyor belt rests on the idlers and the material, coal for example, passes over the idler assembly causing a downward deflection of the system. Generally, the idler assembly is cooperatively connected to a weight sensor. The weight sensor, depending upon the construction of the particular weighing device, converts the downward deflection into a weight measurement. Ideally, a weighing device would combine the weight with a determination of the speed of the moving conveyor belt to yield a rate of flow of material as well as the total weight of the passing material.

The current invention provides an idler having weight measuring load cells and optionally a speed sensor, controller, and a junction box for multiple units. The present invention displays to an operator an accurate reading of the amount of product crossing the invention within a given time interval. Further, the present invention calibrates the weight measurement upon command using a weight connected beneath the idler.

DESCRIPTION OF THE PRIOR ART

Bulk product companies of many descriptions and operators have developed various means and methods for weighing bulk product when moving upon a conveyor. For instance, U.S. Pat. No. 5,338,901 to the same inventor, weighs the conveyor belt passing upon an idler and imposing a load upon two sensors. The sensors detect deflection in the idler and transmit a signal to a controller that converts the signal into a weight. However, in time the loaded conveyor belt can alter the sensors from true readings of the weight passing over an idler.

Regarding other patents, a typical weighing device of this type is disclosed in U.S. Pat. No. 4,682,664 to Kemp. However, this invention has several disadvantages. For example, this design mounts between conveyor frame members and therefore has limited placement. Installation is more difficult and time consuming. Also, this type of device employs two load cells designed for platform weighing. The load cells are mounted under a modified idler and receive the load force at a single point. The force generated by the radial movement of this idler (torsional force) is transmitted to the load cells and is seen as a weight of the same magnitude as the material being weighed. For example, a portion of the torsional movement of the idler is sensed as a downward motion on the weighing apparatus and the torsional movement therefore interferes or adds to the actual weight of the passing material and can give inaccurate weight determinations.

The present invention though overcomes the limitations of the prior art where a need exists to verify weight readings from time to time. That is, the art of the present invention, a loadcell live idler platform scale, calibrates the load cells upon command using a weight incorporated into the scale.

SUMMARY OF THE INVENTION

The loadcell live idler platform scale starts as a conveyor belt weighbridge having idlers to support a conveyor belt frame on which the roller idlers are mounted. The weighbridge can also be mounted above the conveyor belt system and has four load cells connected in pairs perpendicular to each end of the frame. Beneath the idler the present invention has a calibration weight resting in a storage frame.

Additionally, the loadcell live idler platform scale has two cables that suspend the calibration weight and an activator that raises and lowers the calibration weight. The calibration weight and activator are generally cylindrical in shape and parallel to the longitudinal axis of the idler. The invention also has strain gauges disposed to receive deflections from each pair of load cells as the material passes across the weighbridge; a speed detector to determine the speed of the material passing over on the conveyor, where the detector is of the encoder or speed wheel types; and, a programmable controller for converting the information supplied by the strain gauges and speed detector to the desired weight and volume data.

Therefore, it is an object of the invention to provide a new and improved loadcell live idler platform scale.

It is another object of the invention to provide a weighbridge device that incorporates four load cells equally spaced upon both ends of the idler to obtain an accurate total measurement of the weight of the passing material across the weighbridge, unlike the prior art which must extrapolate from a single measurement of weight.

It is still another object of the invention to provide a mechanism to calibrate the load cells and the controller against a known weight for adjustment of the invention from time to time.

It is still another object of the invention to provide a weighbridge device that can determine torsional movement or radial torque as a positive force on the downstream side and a negative force on the upstream side of the conveyor travel and cancel them out of the weight determination upon summation of the forces.

Yet another object of the present invention is to provide a weighbridge device that can measure the speed of movement of the material across the device and compare it with the weight of the material and thus measure the rate of flow of the material.

A further object of the present invention is to provide a weighbridge device that incorporates a programmable controller than can integrate the weight of material and speed of material passing over the weighbridge and convert that information into a digital readout of accurate weight and volume of material passing over the weighbridge.

Another object of the present invention is to provide a weighbridge device that mounts above the conveyor frame so that the device can be easily and conveniently mounted.

Another object of the invention is to provide a weighbridge device that is easy to assembly, durable, accurate, and well suited for the purpose intended.

These and other objects may become more apparent to those skilled in the art upon review of the invention as described herein, and upon undertaking a study of the description of its preferred embodiment, when viewed in conjunction with the drawings.

BRIEF DESCRIPTION OF THE DRAWINGS

The same reference numerals refer to the same parts throughout the various figures.

DESCRIPTION OF THE PREFERRED EMBODIMENT

Figure 1:
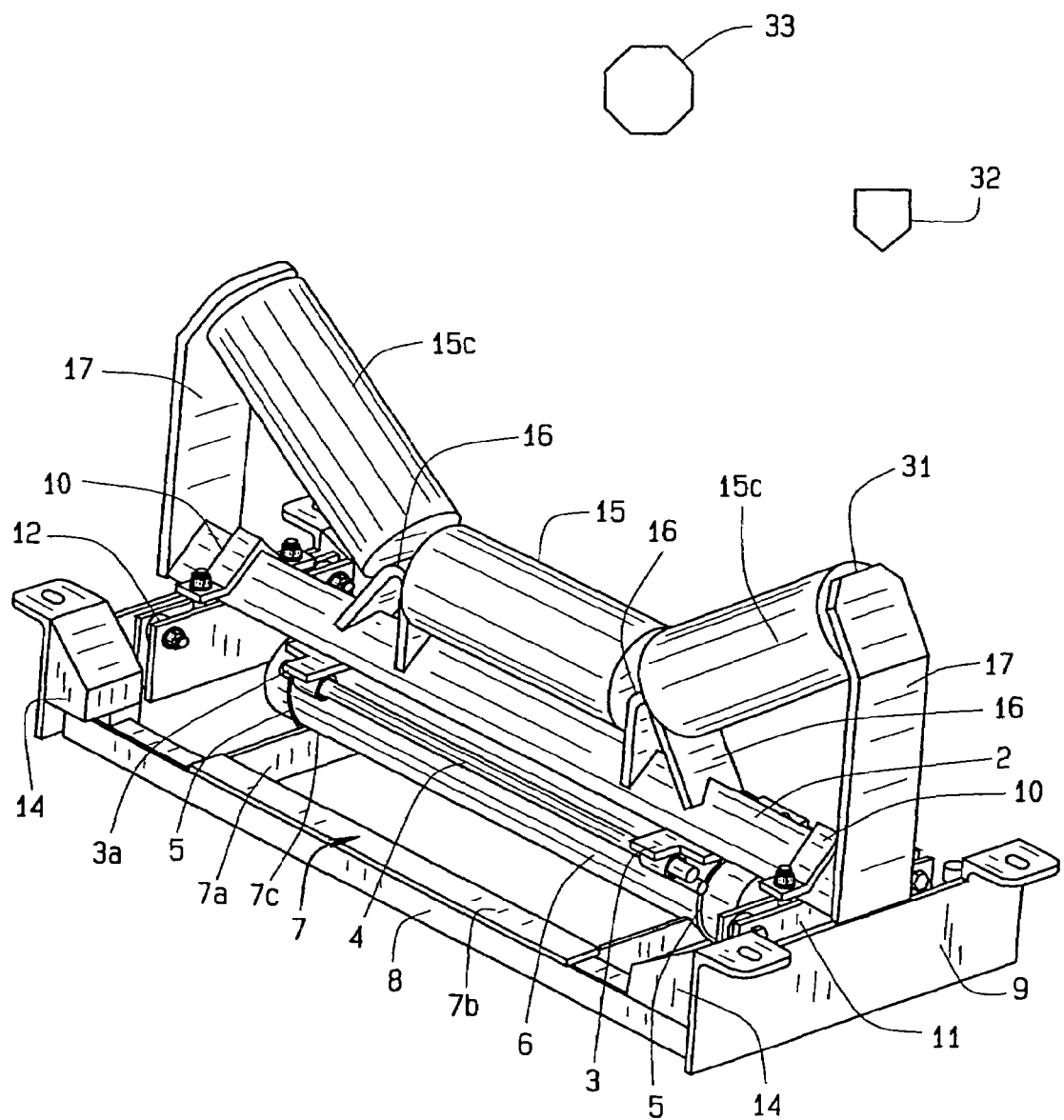
FIG. 1 is an isometric view of the preferred embodiment of the present invention upright.

The present art overcomes the prior art limitations by providing a platform scale that includes a calibration weight that is activated upon manual or electronic command. In referring to the drawings, front means towards the incoming conveyor belt and up means above the conveyor belt, and in particular FIG. 1, the platform scale of the present invention 1 begins with a major roller 15 located beneath the centerline of a conveyor belt (not shown). The major roller is cylindrical and rotates upon two pins located at each end 15a, 15b that turn upon brackets 16. The brackets 16 connect upon the top of a strut 2 in a generally symmetrical arrangement and the strut 2 is parallel to the major roller 15. Adjacent to each end of the major roller 15, a minor roller 15c extends outwards and upwards to flank the sides of the conveyor belt. The axis of rotation of each minor roller 15c is in the same plane as the axis of rotation of the major roller 15. Each minor roller is also cylindrical and rotates upon two pins located at each end. One pin turns upon the bracket 16 opposite the pin from the major roller 15. The other pin, generally the outer, turns upon a support 17. Each support 17 has a greater height than the brackets. The supports then join to the ends of the strut 2. The strut has a generally slender shape and in the preferred embodiment a right angle cross section with the included angle oriented upwards. Two clamps 10, proximate to each support 17, fit over the top of the strut and secure the strut to weight transfer bars 11. The weight transfer bars 11 are arranged in pairs beneath the clamps and also proximate to the supports 17. The weight transfer bars 11 are oriented upright, spaced apart, and mutually parallel. The clamps are bolted to the weight transfer bars with the nuts spanning the weight transfer bars at the bottom. Each pair of weight transfer bars have rod end bearings 12 bolted to each end. The bolts extend through the weight transfer bars generally parallel to the major roller 15 and the strut 2. A rod 13 extends downward from each end bearing 12 later shown in FIG. 4.

Outside of the weight transfer bars, the supports extend from a universal weigh module or frame 9. The frame has two mutually parallel and spaced apart mounting brackets that parallel the centerline of the conveyor. Between the mounting brackets, two spreaders 8a extend generally perpendicular to the mounting brackets 9 forming a spreader assembly 8. The spreaders 8a are mutually parallel and spaced apart, generally away from the major roller and parallel to the major roller 15. The spreaders are commonly available uni-strut channels that are cut to fit the width of the conveyor during installation of the present invention. The spreaders receive a frame 9 for conveyor belts of various widths. Where the spreaders connect to the mounting bracket, the present invention has load cells 14, preferably of the shear beam type. The load cells are of an existing design available from various manufacturers. The load cells 14 have a plate upon which the rods 13 rest from the weight transfer bars 11. As the conveyor bearing bulk product moves, the load from the conveyor reaches the rods 13 and induces strain upon the plate. The load cell 14 then communicates the strain via an electrical signal to a controller 32.

The controller 32 is of the type manufactured by Rice Lake of Rice Lake, Wis. as model 920i. The controller receives the strain signals from the four load cells 14. The signals include the effects of the radial torque of the idler. To remove the radial torque from the load cell signals, the present invention uses two entry load cells located toward the rear of the frame 9 at each end and two IS retreating cells located toward the front of the frame 9 at each end and opposite the entry cells. The controller 32 then integrates the signals of the entry and retreating cells to remove the effects of radial torque. The controller 32 then sums the signals, cleaned of radial torque, by a program to calculate the speed and weight of product crossing the weighbridge or invention 1 at any moment. The speed is determined by either an encoder or a speed wheel rotating with the rollers. The speed and product weight are then display upon a control panel or junction box 33 for the operator to regulate operations of the conveyor as needed.

However, for precise measurements and to account for wear and use of the rollers and load cells, the platform scale requires calibration from time to time. The present invention has a tray 7 located within the spreaders 8a and below the strut 2. The tray 7 spans the width of the spreaders and slightly beyond the brackets 10 upon the strut 2. The tray 7 has a generally rectangular shape with two lateral ends 7a parallel to the centerline of the conveyor and two longitudinal members 7b parallel to the axis of the major roller 15. Each lateral end has a centered cut 7c in which a calibration weight 6 rests. The calibration weight 6 has a generally solid cylindrical form and has a known weight. The calibration weight 6 has a length that extends slightly beyond the lateral ends 7a of the tray 7.

Opposite the calibration weight 6, the strut 2 has two mounts 3 on the underside proximate to the brackets 10 and that extend outwards from the strut. On the front 3a of each mount 3a cable 5 attaches, as later shown in FIG. 2. Each cable 5 passes rearward and downward below the calibration weight 6 then turns upward toward the rear 3*b* where each cable 5 connects to an activator 4. The activator 4 is a slender rod of markedly less diameter than the calibration weight 6. The activator spans nearly the length of the calibration weight and is journaled to the mounts 3. A small motor (not shown) turns the activator upon command. In the preferred embodiment, the activator raises the tray 7 so the idler bears the calibration weight imposed upon the load cells for adjustments. In an alternate embodiment, turning the activator pulls the cables 5 upwards and lifts the calibration weight so the load cells and controller can be adjusted.

Figure 2:
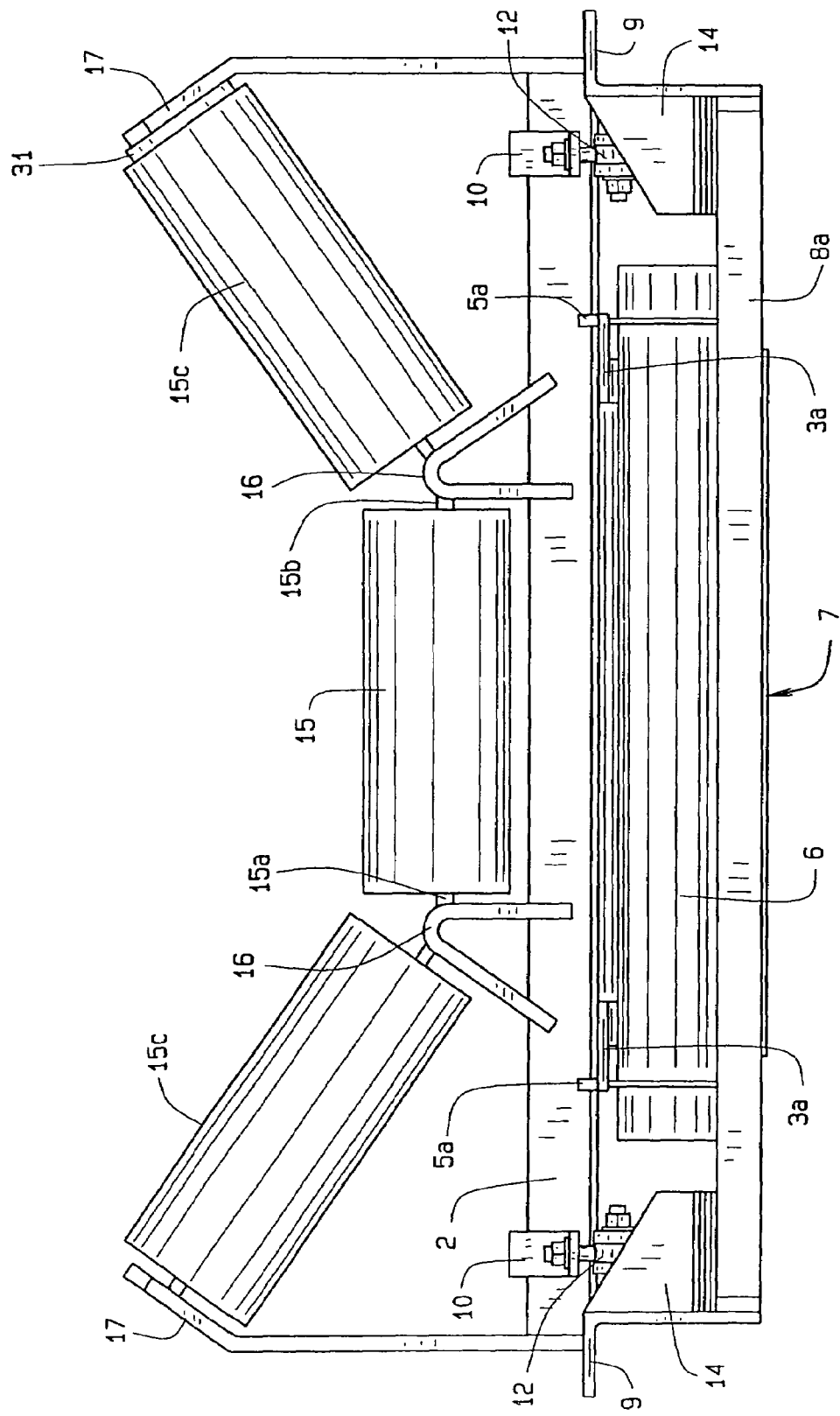
FIG. 2 is a front view of the present invention.

FIG. 2 shows a front view of the present invention as bulk product upon a conveyor approaches the present invention. The conveyor passes over the major roller and minor rollers turning on pins that rotate upon brackets and supports. The supports and brackets join to a strut that spans the width of the invention. Clamps over the strut at each end secure the strut and the attached hardware to transfer bars. The transfer bars 11 have bearings 12 at each end that have rods 13 descending. The rods 13 then engage load cells 14 here shown in trapezoidal covers. Flanking the strut, the present invention has a pair of spreaders. The spreaders permit the present invention to have various widths depending upon the conveyor passing over the weigh bridge. The spreaders 8*a* telescope and adjust the width of the present invention. Within the spreaders is located the tray 7 which holds the calibration weight 6.

The calibration weight rests in the cuts 7*c* and its weight is not applied to the struts. The calibration weight is generally a solid cylinder here shown with a length in excess of the major roller but less than the width of the present invention. The calibration weight is generally parallel to the strut 2 and centered beneath it. The strut has two mounts 3 spaced apart and generally centered on the underside of the strut. In FIG. 2, the fronts 3*a* of the mounts are shown extending outwards from the strut 2. The calibration weight rises and imposes its weight upon the load cells when the cables are drawn upwards. The cables have a fixed length and are anchored 5*a* here on the front of the mounts. Drawing the cables induces a tension into the cable which is resisted by the anchors. In an alternate embodiment, the anchors are removable to ease replacement after sufficient usage or a breakage.

Figure 3:
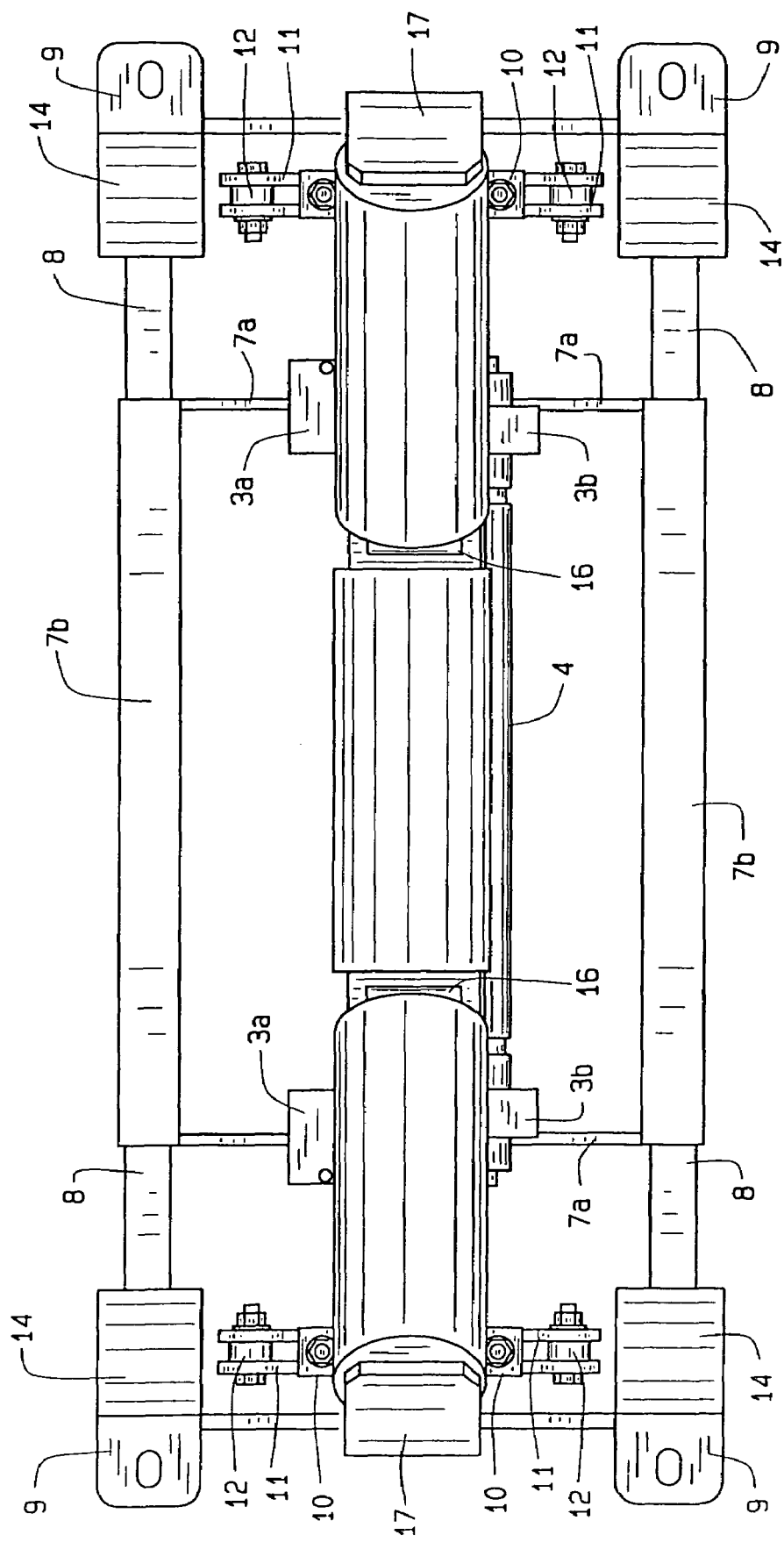
FIG. 3 is a top view of the present invention.

Seen from above in FIG. 3, the present invention has the calibration weight 6 centered beneath the rollers 15 and the strut 2. Opposite the anchors the cables attach to an activator 4 on the rear 3*b* of the mounts 3. Outwards from the mounts 3, the supports 17 descend to the strut 2. At each end, the strut is clamped to two parallel transfer bars here shown upright with a longitudinal edge visible. Generally, the transfer bars receive the live weight loadings from the conveyor. The frame outside of the supports does not necessarily bear the loads from the conveyor. Each pair of transfer bars has a bearing 12 at each end with a rod 13 connected between the bars later shown in FIG. 5. The rods then transmit conveyor loads to the load cells 14 for measurement and integration of speed, weight, and volume of product upon the conveyor.

Figure 4:
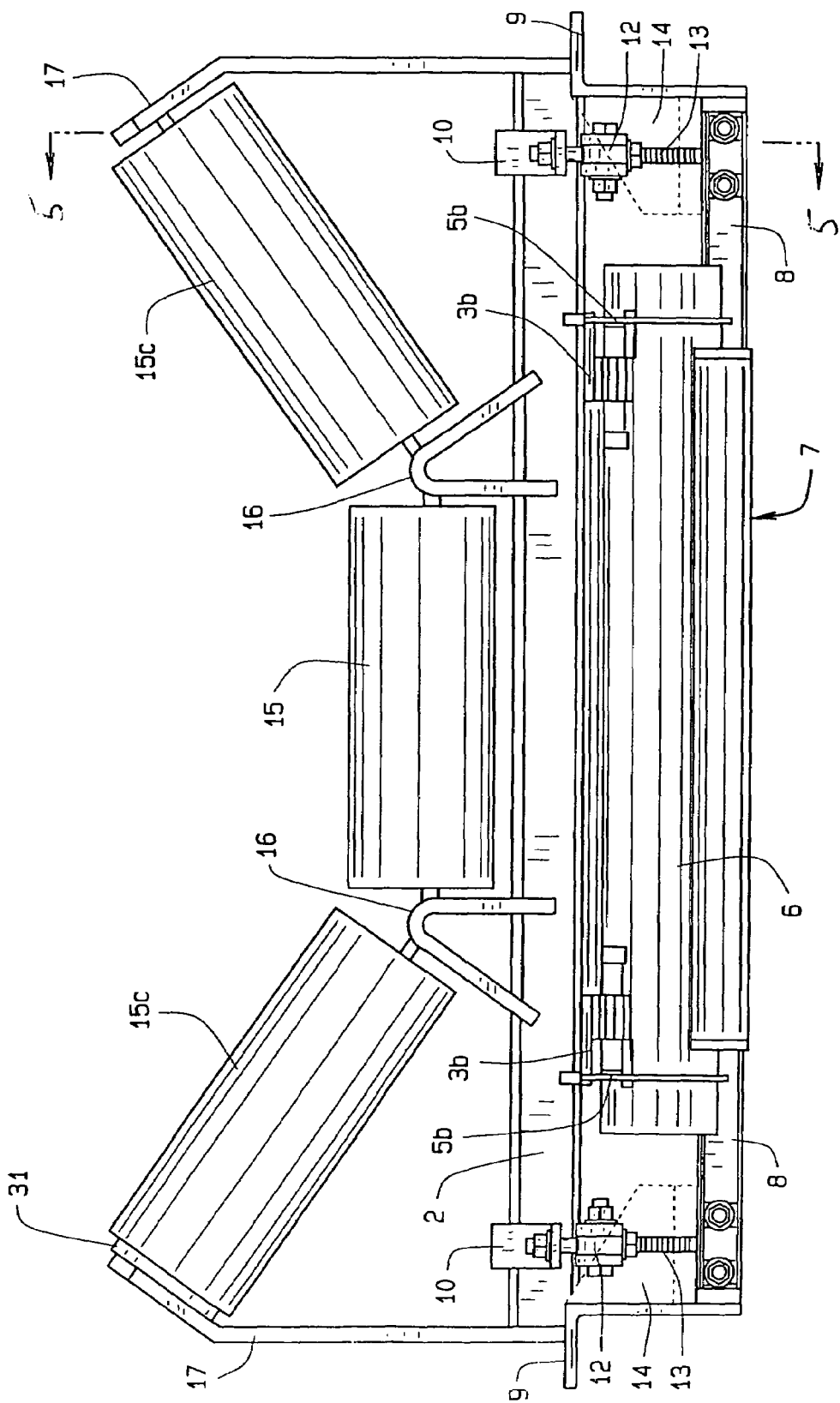
FIG. 4 is a rear view of the present invention showing the activator for the calibration weight and the rods with the rear load cells shown in phantom; and, FIG. 5 is sectional view of the present invention showing the calibration weight and its rest, and the mounting bolts within a load cell.

Opposite FIG. 2, FIG. 4 shows the rear of the present invention when the conveyor has departed the weigh bridge. On the rear 3*b*, the mounts support an activator 4 suspended below. The activator is generally a rod like member of lesser diameter than the calibration weight. A small motor (not shown) turns the activator and in so doing, draws the cables upwards. The upward drawn cables then lift the calibration weight 6 from the tray 7 and impose a known load upon the load cells 14. Under a known load, the load cells are then checked for accuracy by an operator of the present invention. Flanking the tray 7, spreaders 8*a* support the load cells 14 and can change in length to use the invention for various widths of conveyor belt. In the preferred embodiment, the spreader telescopes to adjust its length. In an alternate embodiment, the spreaders are replaced with others of the desired length.

Figure 5:
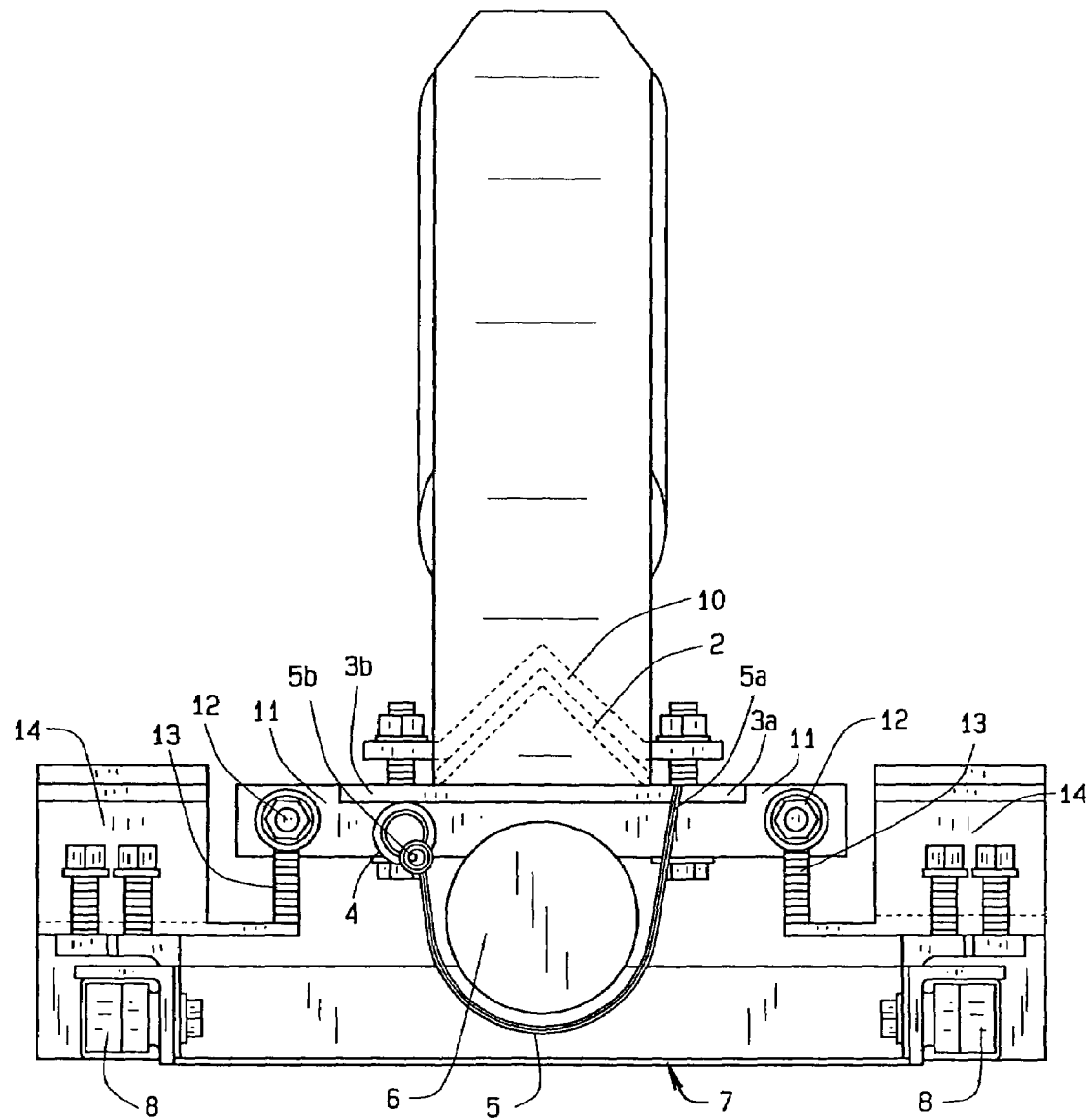

Turning the invention, FIG. 5 illustrates the operation of the calibration weight. In the preferred embodiment, beneath both ends of the strut each mount has an activator connected with the tray 7. Turning on the activators raises the tray 7 as the lateral ends 7*a* bear the calibration weight. Once the tray 7 leaves the spreader assembly 8, the strut bears the calibration weight and that known weight is transferred proportionally to the load cells 14. The operator can then calibrate the controller for an accurate weight reading using the signals from the load cells.

In the alternate embodiment, beneath the strut at both ends, each mount 3 supports a fixed length cable 5. Each cable is secured or anchored 5*a* to the rear 3*a* portion of the mount 3 and then passes beneath and around the calibration weight 6. The cables are generally outside of the tray 7. The cables then run upwards and at their free ends 5*b* connect to the activator 4 using a ring. The ring allows the cable to adjust position as the activator turns. To calibrate the present invention, the activator turns, generally clockwise, to draw up the cables and hence the calibration weight form its first position 6*a* at rest. When off the tray in the second position 6*b*, the calibration weight is applied through the strut to the load cells. To return the present invention to operation, the activator turns, generally counterclockwise, to lower the cables and then the calibration weight upon the tray back to the first position 6*a*.

From the aforementioned description, a moving conveyor scale has been described. This moving conveyor scale is uniquely capable of calibrating load cells with a known weight upon command of an operator. This moving conveyor scale and its various components may be manufactured from many materials including but not limited to polymers, low density polyethylene, high density polyethylene, polypropylene, nylon, ferrous and non-ferrous metals, their alloys, and composites.

Variations or modifications to the subject matter of this invention may occur to those skilled in the art upon reviewing the development as described herein. Such variations, if within the scope of this development, are intended to be encompassed within the principles of this invention, as explained herein. The description of the preferred embodiment, in addition to the depiction within the drawings, is set forth for illustrative purposes only.

I claim:

1. A weighbridge mounted transverse to a conveyor belt and measuring the weight, volume, and speed of product upon the conveyor belt, said weighbridge providing for calibration, comprising:

a strut, generally slender in shape and defining the longitudinal axis of said weighbridge;

at least two mounts, spaced apart and joined beneath said strut, said mounts having a front and an opposite rear;

an activator locating upon the rear of each of said mounts;

a calibration weight locating beneath said strut, having a first position where said calibration weight is at rest and a second position where said calibration weight is applied to said weighbridge;

a tray, having a generally rectangular shape and two opposite lateral ends, said ends having a cut upon which said calibration weight rests when in said first position and two longitudinal members parallel to said struts, said tray connecting to said activator;

a spreader assembly having two mutually parallel and spaced apart spreaders, said spreaders joining to a frame;

said strut having at least two clamps spaced apart and proximate to said frame, each of said clamps connecting to at least one weight transfer bar, said weight transfer bar being parallel to said frame and said lateral ends of said tray and having two spaced apart bearings, each of said bearings including a rod descending below said weight transfer bars; and, at least four load cells locating proximate to the intersection of each of said spreaders with said frame and each of said rods contacting one of said load cells.

2. The weighbridge of claim 1 further comprising:

said frame having at least one roller in contact and transverse to said conveyor belt, each of said rollers having two ends, at least one bracket supporting said ends of said roller and at least one support carrying the outermost ends of said rollers.

3. The weighbridge of claim 2 further comprising:

said frame having a major roller and two minor rollers flanking said major roller where said minor rollers and said major roller being coplanar, two of said brackets with one bracket at each end of said major roller and two of said supports with one support at each minor roller opposite said bracket and towards the outside of said weighbridge.

4. The weighbridge of claim 3 further comprising:

said supports having greater height than said brackets thus accommodating a conveyor belt with upturned edges.

5. The weighbridge of claim 1 further comprising:

said spreaders being adjustable in length.

6. The weighbridge of claim 1 further comprising:

at least two cables having a fixed length, a fixed end and an opposite free end, said fixed ends connecting to the fronts of said mounts and said free ends connecting to said activator, wherein turning on said activator pulls said free end and lifts said calibration weight to said second position and turning off said activator lowers said free end and lowers said calibration weight to said first position.

7. The weighbridge of claim 1 further comprising:

two entry load cells locating towards the rear of said weighbridge generally opposite said activator;

two retreating load cells locating towards the front of said weighbridge generally proximate to said activator; and, said controller sums the signals from said entry load cells and said retreating load cells to remove radial torque from measurements.

8. The weighbridge of claim 1 further comprising:

each of said clamps connecting to two of said weight transfer bars, said weight transfer bars being oriented upright and permitting said rods to descend between said weight transfer bars, and said clamps connecting beneath said weight transfer bars.

\* \* \* \* \*